US012601064B2

(12) United States Patent
Kalakodimi et al.

(10) Patent No.: US 12,601,064 B2
(45) Date of Patent: Apr. 14, 2026

(54) CORROSION CONTROL FOR WATER SYSTEMS USING PASSIVATORS AND A HYDROXYCARBOXYLIC ACID

(71) Applicant: CHEMTREAT, INC., Glen Allen, VA (US)

(72) Inventors: Rajendra Prasad Kalakodimi, Glen Allen, VA (US); Santanu Banerjee, Glen Allen, VA (US); Patrick Wood, Glen Allen, VA (US); Deann C. Guy, Ruther Glen, VA (US); Curt Turner, Mechanicsville, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 390 days.

(21) Appl. No.: 18/324,485

(22) Filed: May 26, 2023

(65) Prior Publication Data

US 2023/0383415 A1     Nov. 30, 2023

Related U.S. Application Data

(60) Provisional application No. 63/346,134, filed on May 26, 2022.

(51) Int. Cl.
C23F 11/18     (2006.01)
C02F 5/10     (2023.01)
(Continued)

(52) U.S. Cl.
CPC .............. C23F 11/18 (2013.01); C02F 5/105 (2013.01); C23F 11/08 (2013.01); C23F 11/12 (2013.01);
(Continued)

(58) Field of Classification Search
None
See application file for complete search history.

(56) References Cited

U.S. PATENT DOCUMENTS 2,848,299 A * 8/1958 Kahler .................. C23F 11/187
                                                          422/18
4,061,473 A * 12/1977 Norris ....................... C10L 1/32
                                                          44/314
(Continued)

FOREIGN PATENT DOCUMENTS

JP          H10214727 A       8/1998
KR          2178722    * 11/2020
(Continued)

OTHER PUBLICATIONS

Ozdemir. "1.1 Aqueous Corrosion Inhibition Studies Of Mild Steel Alloy By Oxyanion Esters Of Hydroxy Acids And Their Salts" 969-985. International Journal of Engineering Research and Applications. WebHttps://citeseerx.ist.psu.edu/document?repid=pre1&type=pdf&doi=16e777204b77281 0f8e4e76 cdad36540ebab21 b3. Feb. 2013; p. 982 paragraph 5.

*Primary Examiner* — Joseph D Anthony
(74) *Attorney, Agent, or Firm* — Oliff PLC

(57) ABSTRACT

Methods and compositions for suppressing corrosion of a corrodible metal surface that contacts a water stream in a water system. The method comprises introducing into the water stream a treatment composition, the treatment composition including a combination of passivators and a hydroxycarboxylic acid promoter.

16 Claims, 3 Drawing Sheets

(51) Int. Cl.
    *C23F 11/08*       (2006.01)
    *C23F 11/12*       (2006.01)

(52) U.S. Cl.
    CPC ........ *C23F 11/187* (2013.01); *C02F 2303/08*
                                          (2013.01)

(56)              References Cited

U.S. PATENT DOCUMENTS

| | | | |
|---|---|---|---|
| 4,885,136 | A | 12/1989 | Katayama et al. |
| 4,913,823 | A | 4/1990 | Lipinski et al. |
| 8,025,840 | B2 * | 9/2011 | Crovetto ............... C23F 11/124 |
| | | | 252/387 |
| 9,115,432 | B2 | 8/2015 | Richardson et al. |
| 9,290,049 | B2 | 3/2016 | Chen |
| 9,290,849 | B2 | 3/2016 | Richardson et al. |
| 10,174,429 | B2 | 1/2019 | Kalakodimi et al. |
| 11,479,864 | B2 | 10/2022 | Henderson et al. |
| 11,597,846 | B2 | 3/2023 | Kalakodimi et al. |
| 2006/0118761 | A1 | 6/2006 | Stapp |
| 2007/0157845 | A1 * | 7/2007 | Aiba ...................... H05K 3/282 |
| | | | 106/14.44 |
| 2008/0113102 | A1 * | 5/2008 | Arai ...................... C23F 11/173 |
| | | | 252/387 |
| 2010/0111756 | A1 * | 5/2010 | Crovetto ................. C02F 5/105 |
| | | | 252/387 |
| 2012/0119152 | A1 | 5/2012 | Smith et al. |
| 2012/0172277 | A1 | 7/2012 | Schacht et al. |
| 2015/0118103 | A1 | 4/2015 | Erickson et al. |
| 2016/0145442 | A1 | 5/2016 | Kalakodimi et al. |
| 2016/0215400 | A1 | 7/2016 | Kalakodimi et al. |
| 2017/0130340 | A1 | 5/2017 | Kalakodimi et al. |
| 2018/0016197 | A1 | 1/2018 | Kalakodimi et al. |
| 2018/0030345 | A1 | 2/2018 | Gill et al. |
| 2021/0002773 | A1 | 1/2021 | Henderson et al. |
| 2022/0127731 | A1 | 4/2022 | Clemens et al. |
| 2022/0205112 | A1 | 6/2022 | Kalakodimi et al. |

FOREIGN PATENT DOCUMENTS

| | | |
|---|---|---|
| WO | 2019113005 A1 | 6/2019 |
| WO | 2019/143989 A1 | 7/2019 |

* cited by examiner

NYQUIST PLOT

CONTROL
EXAMPLE 5 150ppm
EXAMPLE 6 150ppm
0.75ppm Zn
3.75ppm PO4
0.75ppm Zn + 3.75ppm PO4

-Zim (ohms)

Zre (ohms)

CORROSION CONTROL FOR WATER SYSTEMS USING PASSIVATORS AND A HYDROXYCARBOXYLIC ACID

This application claims priority to Provisional Application No. 63/346,134, filed May 26, 2022. The entire contents of the prior application are hereby incorporated by reference herein in their entirety.

TECHNICAL FIELD

This application is directed to methods and compositions for corrosion inhibitor treatment in water systems, such as those used in industrial processes.

BACKGROUND

Corrosion in industrial water systems is a serious problem. It causes undesirable consequences, including loss of heat transfer, increased cleaning frequency, equipment repairs and replacements, shutdowns, environmental problems and the increasing resources and costs associated with each.

Treatment of corrosion in water systems is typically achieved by continuous application of various corrosion inhibitors in the water including, for example, phosphates, polymer, chromates, zinc, molybdates, nitrites, and combinations thereof. These inhibitors work by the principle of shifting the electrochemical corrosion potential of the corroding metal in the positive direction indicating the retardation of the anodic process (anodic control), or displacement in the negative direction indicating mainly retardation of the cathodic process (cathodic control). Corrosion inhibitors act on the cathode and/or anode of the corrosion cell.

Common corrosion inhibitors include salts of orthophosphate, polyphosphates, phosphonates, Zinc, molybdates, silicates, nitrites, etc. Among these corrosion inhibitors, phosphorus based corrosion inhibitors are widely used for carbon steel corrosion control in cooling water applications because they have good cost effectiveness and performance. However, cooling water is eventually discharged into surface water, and there are increased concerns on the impact of phosphorus on the environment due to algal blooms. Although somewhat effective, there are multiple issues associated with these zinc and phosphate chemistries as corrosion inhibition treatments: (1) these chemistries do not form very tenacious films and minor changes in environment (e.g., pH depression) can destroy the film, and corrosion products can accumulate before the film is reestablished through normal treatment, (2) due to the tendency for zinc and phosphate to precipitate on heat transfer surfaces when applied at levels required to form a robust passive film, and (3) discharge of chemicals such as phosphates and zinc is often limited by environmental regulations. Industries may face great difficulties in discharging the higher levels of these chemicals. In this regard, regulatory requirements around phosphorous continue to become more stringent requiring a cooling water corrosion inhibitor product solution that can provide the facilities with less than 2 ppm (and typically less than 1 ppm or 0.5 to 1 ppm) of phosphorous in their discharge streams.

Tin compounds as a corrosion inhibitor has been the subject of some experimentation in industrial water systems. Formulations of certain stannous salts are uniquely suited for protection of steel in various waters by forming a tenacious protective layer on metal surfaces at economical treatment levels. Unlike phosphate and zinc-based passivation treatments, these stannous salt formulations can be applied at effective levels without risk of fouling heat transfer surfaces. Moreover, the stannous salt passivation formulations pose much less risk to the environment than the chromate, zinc, and phosphate chemistries previously used for corrosion inhibition.

Methods of using tin corrosion inhibitors in combination with hydroxycarboxylic acid promoters have also been proposed as described in U.S. Pat. No. 10,174,429 to Kalakodimi, et al., which is hereby incorporated by reference in its entirety. These methods enhance the effectiveness of a tin-based corrosion inhibitor while allowing smaller concentrations of inhibitor and promoter.

Conventional corrosion inhibition practices with tin compounds have not been able to effectively deal with the problem of maintaining an effective amount of Tin(II) in solution long enough to form a protective film on the surface of the corrosive metal without losing the active form, Tin (II), perhaps due to bulk phase oxidation and precipitation to Tin (IV). Further, use of organic compounds as corrosion inhibitors has been challenging and, in many cases, prohibitive due to volume and cost requirements. Further still, methods of using tin corrosion inhibitors in combination with hydroxycarboxylic acid promoters leave room for improvement in terms of efficiency and cost. These and other issues are addressed by the present disclosure.

SUMMARY

It is an object of this disclosure to provide methods for improved and effective use of high performance, non-phosphorus chemical corrosion inhibition treatment programs which can be used in cooling water applications for preventing the carbon steel corrosion. The treatment programs include a synergistic combination of passivators, such as salts of multi-valent metals, and hydroxycarboxylic acids. Treatment programs may further include dispersant polymers that create additional synergy. These treatment programs are more environmentally friendly than the current common phosphorus corrosion inhibitors and more efficacious and synergistic than current stannous and hydroxycarboxylic acid treatments.

In a first embodiment, there is provided a method of suppressing corrosion of a corrodible metal surface that contacts a water stream in a water system. The method includes introducing into the water stream a treatment composition including a combination of passivators and a hydroxycarboxylic acid promoter, the hydroxycarboxylic acid promoter having a carboxylic acid group and a hydroxyl group that is bonded to a carbon atom that is adjacent to the carboxylic acid group. The treatment composition is introduced so that a concentration of the combination of passivators is in a range of 0.1 to 10 ppm, and a concentration of the promoter in the water stream is in the range of 2 ppm to 50 ppm.

In a second embodiment, there is provided a method of suppressing corrosion of a corrodible metal surface that contacts a water stream in a water system. The method includes introducing into the water stream a treatment composition including a combination of salts of multi-valent metals and a hydroxycarboxylic acid promoter, the hydroxycarboxylic acid promoter having a carboxylic acid group and a hydroxyl group that is bonded to a carbon atom that is adjacent to the carboxylic acid group. The treatment composition is introduced so that a concentration of the combination of salts of multi-valent metals is in a range of 0.1 to 10 ppm, and a concentration of the promoter in the water stream is in the range of 2 ppm to 50 ppm.

In another embodiment, there is provided a chemical treatment composition used to suppress corrosion of a corrodible metal surface that contacts a water stream in a water system. The composition includes a combination of salts of multi-valent metals and a hydroxycarboxylic acid promoter, the hydroxycarboxylic acid promoter having a carboxylic acid group and a hydroxyl group that is bonded to a carbon atom that is adjacent to the carboxylic acid group. A concentration of the combination of salts of multi-valent metals is in a range of 0.1 to 10 ppm, and a concentration of the promoter in the water stream is in the range of 2 ppm to 50 ppm.

DETAILED DESCRIPTION

Overview

Figure 1:
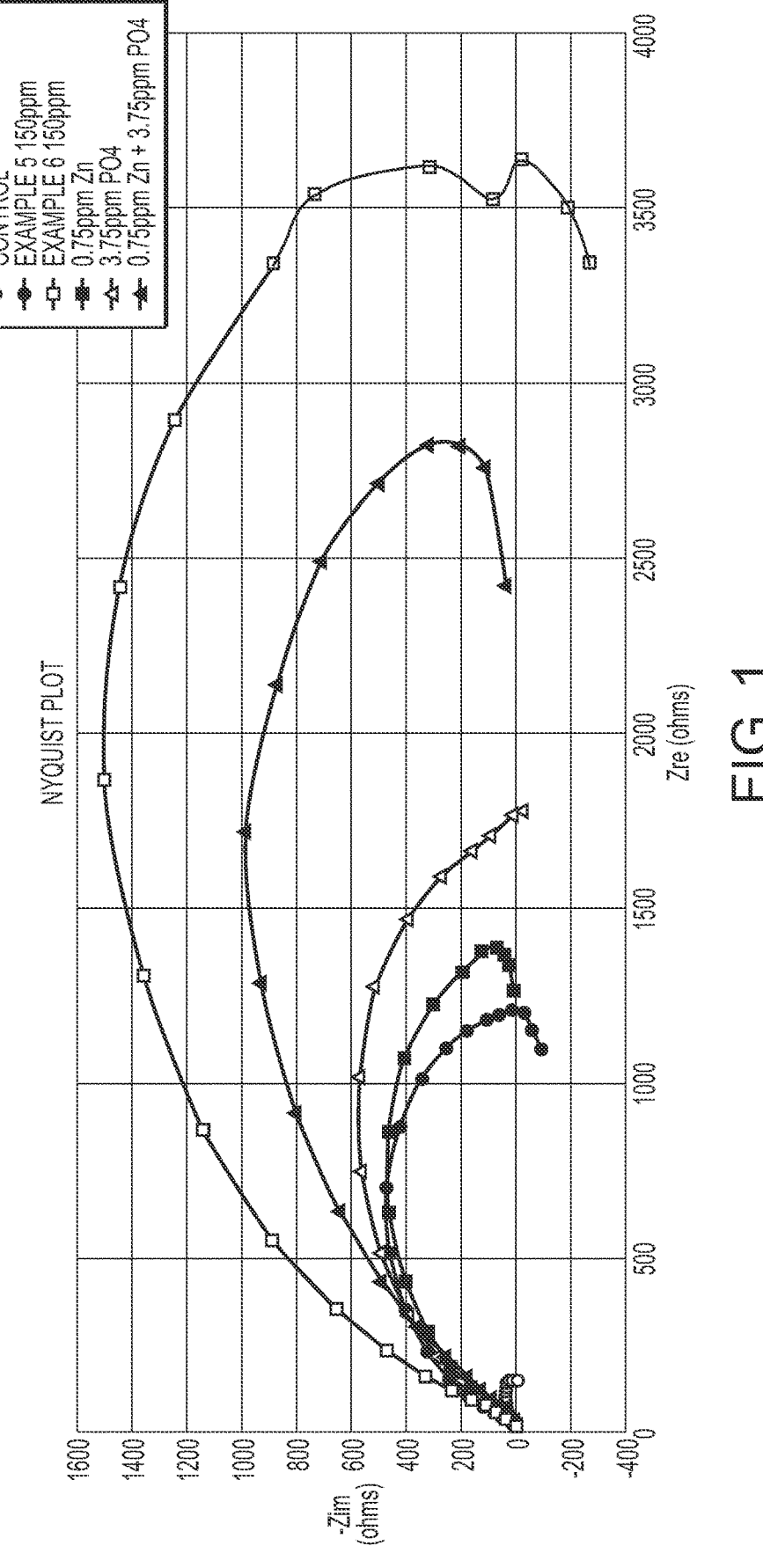
FIG. 1 is a Nyquist graph showing corrosion inhibition performance of various treatment compositions.

Embodiments of the disclosed methods and compositions apply the discovery of improved corrosion inhibition to water systems including, but not limited to cooling towers, water distribution systems, boilers, pasteurizers, water and brine carrying pipelines, storage tanks and the like. Embodiments of the methods and compositions are particularly useful with cooling towers in industrial water processes. Improved corrosion inhibition can be achieved at lower cost and with less environmental impact by treating water systems with a combination of passivators and a hydroxycarboxylic acid promoter compound. Disclosed embodiments form a very tenacious and persistent inhibitor film on the surface of corrodible metal by treatment with a combination of passivators together with a promoter compound.

Disclosed treatment methods result in superior corrosion inhibition and a significant reduction in the amount of passivators and promoter required, which is beneficial for the environment and reduces the cost of treatment. The methods provide for more economical treatment of large volume systems including, for example, once-through applications and other systems in which the water consumption and losses pose a significant challenge for dosage and control using conventional anti-corrosion treatments. The methods also greatly reduce the amount of passivators and/or corrosion inhibitor(s) required to protect the treated system by reducing consumptive losses associated with oxidation and discharge of water from the system.

The reason for the above is believed to be the synergistic combination of passivators and the hydroxycarboxylic acid used embodiments. Moreover, combining passivators tends to result in more complete passivation. Disclosed embodiments are also beneficial if the effluent from the treated system is being used in a manner or for a purpose where a conventional inhibitor would be regarded as a contaminant or otherwise detrimental to the intended use. Such treatments are more tolerant of overdosing when compared to conventional zinc or phosphate, and current stannous corrosion inhibitors and hydroxycarboxylic acid programs which rely on high volumes of polymeric dispersants to suppress formation of unwanted deposits.

Passivators with Promoter

The combination of passivators according to embodiments may include any two salts of multi-valent metals capable of forming stable metal oxides resistant to dissolution under the conditions in the targeted system. Preferably, the metal may be selected from the group consisting of manganese, tungstate, aluminum, and tin. The passivators according to embodiments may also include non-metallic salts including, but not limited to, esters of disclosed metallic salts, e.g., phosphate esters.

Preferably, tin is included as the first metal salt. Disclosed embodiments may use tin as a corrosion inhibitor Tin particularly suitable for use with the disclosed methods include Tin(II) compounds. Tin(II) is more soluble in aqueous solutions than a higher oxidation state metal ion, such as Tin(IV). For such metals, the lower oxidation state species can be introduced into the treated system by, for example, introducing a stannous salt directly or by feeding a concentrated solution into the treated system. Corrosion inhibitors are consumed within a treated system in various ways. These consumption pathways can be categorized as system demand and surface demand. Together, system demand and surface demand comprise total inhibitor demand.

The Tin(II) may be provided as a stannous salt selected from the group consisting of stannous sulfate, stannous bromide, stannous chloride, stannous oxide, stannous phosphate, stannous pyrophosphate, and stannous tetrafluroborate. Other reactive metal salts, for example, zirconium and/or titanium metal salts, may also be used in treatment methods according to the present disclosure.

A concentration of the first metal salt, e.g., tin, in the water stream may be present in relatively small amounts, e.g., in the range of 0.01 ppm to 3 ppm, 0.05 ppm to 2 ppm, 0.1 ppm to 1.25 ppm, or 0.5 ppm to 0.75 ppm, in the water system.

Preferably, aluminum is included as the second metal salt. Aluminum may function as a supplemental corrosion inhibitor or secondary promoter (secondary to the hydroxycarboxylic acid promoter). Without intending to be bound by theory, it is believed that the disclosed treatments work by at least one of removing aluminum silicate from the water stream, and forming an aluminum silicate film on a surface. In conventional water treatment systems, aluminum was merely used as a coagulant and not considered a corrosion inhibitor. The inventors unexpectedly found that combining aluminum with other multi-valent metals and hydroxycarboxylic acid provided surprisingly beneficial corrosion inhibition. In embodiments, the aluminum salt may be an inorganic or organic aluminum salt. Inorganic aluminum salts may include, but are not limited to, aluminum chloride, polyaluminum chloride, aluminum nitrate, and aluminum sulfate. Organic aluminum salts may include, but are not limited to, aluminum citrate and aluminum glucanate. In preferred embodiments, the aluminum salt may be aluminum chloride.

A concentration of the second metal salt, e.g., aluminum, in the water stream may be present in relatively small amounts, e.g., in the range of 0.01 ppm to 3 ppm, 0.05 ppm to 2 ppm, 0.1 ppm to 1.25 ppm, 0.25 to 0.75 ppm, or 0.3 ppm to 0.5 ppm, in the water system.

According to embodiments, the synergistic combination of the first metal salt and the second metal salt results in significantly lower total metal salt amounts than previously possible. For example, the combined about of the first metal salt, e.g., tin, and the second metal salt, e.g., aluminum, may be present in the range of 0.01 ppm to 50 ppm, 0.05 ppm to 20 ppm, 0.1 ppm to 10 ppm, 0.1 ppm to 5 ppm, 0.25 to 1.5 ppm, or 0.25 to 1.5 ppm, in the water system.

Promoter compounds particularly suitable for use in embodiments are hydroxycarboxylic acids. Hydroxycarboxylic acids are carboxylic acids substituted with a hydroxyl group on adjacent carbon moieties. Hydroxycarboxylic acids are well known organic compounds applied in various applications. Examples include, but are not limited to, tartaric acid, glucaric acid, glucoheptonate, maleic acid, gluconic acid, and polyaspartic acid. In embodiments, the promoter can be glucaric acid. In embodiments, the promoter can be a polymeric hydroxycarboxylic acid.

The concentration of the hydroxycarboxylic acid promoter in the water stream may be present in the range of 0.1 ppm to 100 ppm, 0.5 ppm to 50 ppm, 2 ppm to 50 ppm, 5 ppm to 20 ppm, or 7.5 ppm to 20 ppm, in the water system.

In embodiments, a ratio of a concentration of the combination of metallic salts in the water stream in terms of ppm to a concentration of the promoter in the water stream in terms of ppm may be in the range of 0.001 to 0.4, 0.01 to 0.2666, or 0.05 to 0.1666. The ratio may also be in the range of 0.00025 to 0.4, 0.00033 to 0.2666, or 0.005 to 0.1666.

In embodiments, a ratio of a concentration of the first metallic salt in the water stream in terms of ppm to a concentration of the promoter in the water stream in terms of ppm may be in the range of 0.001 to 0.4, 0.01 to 0.2666, or 0.05 to 0.1666. The ratio may also be in the range of 0.00025 to 0.4, 0.00033 to 0.2666, or 0.005 to 0.1666.

In embodiments, a ratio of a concentration of the second metallic salt in the water stream in terms of ppm to a concentration of the promoter in the water stream in terms of ppm may be in the range of 0.001 to 0.4, 0.01 to 0.2666, or 0.05 to 0.1666. The ratio may also be in the range of 0.00025 to 0.4, 0.00033 to 0.2666, or 0.005 to 0.1666.

In embodiments, a ratio of a concentration of the corrosion inhibitor in the water stream in terms of ppm to a concentration of the metallic salt in the water stream in terms of ppm may be in the range of 0.001 to 10, 0.01 to 1, or 0.75 to 1.25. The ratio may also be in the range of 0.5 to 1.5, 0.75 to 1, or 0.8 to 1.1.

The concentration of the combination of metallic salts and promoter achieved during the corrosion inhibitor treatment can be selected to exceed the baseline system demand and thereby ensure that a portion of the inhibitor fed is available to treat the vulnerable metal surfaces.

System demand, in many scenarios, is attributed to the presence of oxygen, halogens, other oxidizing species and other components in the aqueous system that can react with or remove, and thereby deactivate or consume, the inhibitor. With stannous salt treatments, for example, oxidizing species can convert the preferred Tin(II) stannous ions to largely ineffective (at least in the process water stream) Tin(IV) stannate ions. System demand also includes inhibitor losses associated with bulk water loss through, for example, blow down and/or other discharges from the treated system.

Surface demand is the consumption of the inhibitor attributed to the interaction between the inhibitor and a reactive metal surface. Surface demand will decline as the inhibitor forms a protective film or layer on those metal surfaces that were vulnerable to corrosion. Once all of the wetted surfaces have been adequately protected, the surface demand may be nothing or almost nothing. Once the surface demand is reduced to values close to zero, the requirement for additional corrosion inhibitor may be substantially reduced or even terminated for some period of time without compromising the effectiveness of the corrosion inhibition.

Stannous compounds undergo oxidation at the vulnerable metal surfaces, or those surfaces in need of corrosion protection, and form an insoluble protective film. These metal surfaces can also react with the stannous compounds to form metal-tin complexes, which again form protective films on the metal surface. Without intending to be bound by theory, stannous inhibitors applied in accordance with the disclosed methods appear to form a protective film on reactive metals by at least three mechanisms. A first mechanism involves forming an insoluble stannous hydroxide layer under alkaline conditions. This stannous hydroxide appears to oxidize further to form a stannate oxide layer, which is even more insoluble, resulting in a protective film which is resistant to dissolution from the surface even in the absence of stannous salts in the process water. A second mechanism may be achieved under acidic conditions or in the presence of surface oxidants, for example, ferric or cupric ions, whereby the stannous salts can be directly oxidized to highly insoluble stannate salts. These stannate salts then precipitate onto the metal surface to form a protective layer and provide the desired corrosion inhibition function. A third mechanism may be achieved under alkaline conditions whereby existing metal oxides are reduced to more stable reduced forms that incorporate insoluble stannate salts in a hybrid film.

In each of the above mechanisms, the final result is a stannate film, Tin (IV), formed on or at the metal surface. The insolubility and stability of the resulting stannate film provides an effective barrier to corrosion for a limited time period even in the absence of additional stannous species being provided in the aqueous component of the treated system. The Tin (IV) film structure has been confirmed by X-ray photoelectron spectroscopy (XPS) analysis of metal surfaces. XPS reveals the presence of the Tin(IV) film on the metal coupon surface.

Treatment Methods and Compositions

In a first embodiment, there is provided a method of suppressing corrosion of a corrodible metal surface that contacts a water stream in a water system. The corrodible metal surface may be a metal or alloy selected from the group consisting of ferrous metals, aluminum metals, brass, copper containing alloys, and galvanized steels. The method includes introducing into the water stream a treatment composition over a first time period, the treatment composition including a combination of salts of multi-valent metals and a hydroxycarboxylic acid promoter.

The combination of the salts of multi-valent metals and a hydroxycarboxylic acid promoter in a combined treatment feeding results in a synergistic anti-corrosive effect. For example, the combined treatment according to embodiments results in unexpectedly high anti-corrosion rates using relatively smaller effective amounts of metallic salts and hydroxycarboxylic acid promoter that are otherwise not as effective in single treatment regimes. Without intending to be bound by theory, it is believed that the promoter compound is accomplishing two processes: (1) it is forming a corrosion inhibiting film on the metal surface, and (2) it is effectively chelating the metal active state, e.g., Tin(II), for a longer period of time than conventionally known thereby enabling the Tin(II) to react with the metal surface and form a resilient Tin(IV) film. Although the mechanism is unknown, it is believed that the hydroxycarboxylic acid promotes the Tin(II) active state by acting as chelating agent.

The method and manner by which the treatment is infused into a water stream is not particularly limited by this disclosure. Treatment can be infused into the water system at a cooling tower, for example, or any suitable location of the water stream in the water system. Methods for infusing the treatment, including controlling the flow of the infusion, may include a multi-valve system or the like, as would be understood by one of ordinary skill in the art. Moreover control of the treatment while in the system is not particularly limited. Infusion control, including frequency, duration, concentrations, dosing amounts, dosing types and the like, may be controlled manually or automatically through, for example, an algorithm or a computer executable medium, such as a CPU. These controls may further be implemented with data and history-driven learning capabilities and feedback loops for automatically adapting treatment regimens to system and metallic surface environmental conditions. The treatment can be continuous, intermittent or periodic. The metallic salts can be added to the water stream apart from the hydroxycarboxylic acid promoter, or each can be added separately.

The treatment may stay in the system for a full cycle (i.e., through a heat exchanger, etc.) or several cycles, and is then gradually removed from the system with the process water in the system, for example, through known blowdown removal techniques in the case of a cooling water. Metal salts and/or corrosion inhibitors are consumed within a treated system in various ways. These consumption pathways can be categorized as system demand and surface demand. Together, system demand and surface demand comprise total salt or inhibitor demand.

The amount of the treatment composition can be applied based on the system demand and surface demand for the inhibitor. Controlling the amount of the treatment composition can utilize a number of parameters associated with surface and system demands including, for example, the concentration of corrosion products in the water or the demand of a surface of the metal for reduction species. Other parameters such as on-line corrosion rates and/or oxidation reduction potential (ORP) may also be used for controlling the treatment frequency or monitoring system performance.

The treatment may include, in addition to the metallic salts many other materials. For example, the treatment may comprise, at least one of citric acid, benzotriazole and 2-Butenedioic acid (Z), bicarbonates for increasing the alkalinity of the solution, a polymeric dispersant, such as 2-acrylamido-2-methylpropane sulfonic acid (AMPS), for inhibiting silt or fouling, and polymaleic acid (PMA) for inhibiting scaling. The treatment may include, for example, ChemTreat FlexPro®. CL5632 (a phosphorous-free and zinc-free corrosion treatment), manufactured by ChemTreat, Inc., or the like.

The treatment composition may be shot-dosed, service-dosed or continuously fed. The duration of the treatment dosing can range from 5 minutes to 2 days, or more preferably, from 10 minutes to 24 hours, in the case of shot-dosing. The duration of service-dosing may be substantially the same or less depending on the target concentration requirements in the water stream. Similarly, the duration of continuous feeding treatments depend on system demand as discussed herein.

At the early stages of the treatment in a system with existing corrosion and/or exposed metal surfaces, the total metallic salt or inhibitor demand will be high but will decrease as metal surfaces are treated by the treatment. A treatment end point is reached where all surfaces are treated and only the system (non-metal surface) demand remains. Once effective treatment is achieved using the treatment period(s), the system can be operated for extended periods without the need for any further addition of metallic salts or with a substantially reduced level of metallic salts.

In another embodiment, after the period where substantially reduced levels of combination of metallic salts are added, the method may include introducing into the water stream the treatment composition over a second time period, during which a second concentration of the combination of metallic salts in the water stream may be substantially the same or less than the initial concentration of the combination of metallic salts. In the second time period, a second concentration of the promoter in the water stream may be substantially the same or less than the first concentration of the promoter. The duration of the second time period is not particularly limited and may be shorter of longer than the first time period depending on system requirements.

In embodiments employing such intermittent or periodic treatment, the frequency or time between treatments is not particularly limited. The frequency may be from about 2 to 30 days, or preferably 3 to 7 days. More preferably, the time between treatments is about 7 days. In some systems, it may be beneficial to maintain some continuous level of active corrosion inhibitor in the water process stream after the treatment period. Maintaining a continuous low to very low level of active metallic salts after the treatment dosing may reduce the frequency at which subsequent treatments are needed. The duration, timing and concentration of the treatment doses can vary with the system demand as described herein.

As will be appreciated, the frequency of the combination feedings and the metallic salts and promoter concentrations necessarily will be a function of the system being treated and can be set and/or adjusted empirically based on test or historical data. In embodiments, the concentration of the metallic salts achieved during the treatment can be selected to exceed the baseline system demand and thereby ensure that a portion of the metallic salts fed is available to treat the vulnerable metal surfaces.

The success of the treatment may be evaluated by monitoring the total inhibitor demand which, when the surface demand is effectively suppressed or eliminated, will be essentially equal to the system demand. The system demand, in turn, can be measured indirectly by monitoring parameters such as ORP and oxygenation levels. Thus, according to one embodiment, the treatment method may further comprise measuring and monitoring a characteristic of the metal surface or water stream during or after treatments to determine a time to initiate the treatment comprising the metallic salts and promoter, and/or a concentration of the metallic salts and promoter in the treatment composition.

If desired, additional corrosion inhibition and/or water treatment chemistry known in the art can be introduced into the system in conjunction with the combination feeding to further improve corrosion performance and control deposition of undesirable species. As will be appreciated, the treatment methods according to the disclosure can be paired with other treatment or conditioning chemistries that would be compromised by the continuous presence of the corrosion inhibitor. Alternatively, "greener" treatment packages or treatment packages designed to address other parameters of the system operation can be utilized between the intermittent feedings to improve the quality of the system effluent and/or reduce the need for effluent treatment prior to discharge.

According to one embodiment, treatment composition may comprise a reducing agent. Controlling the amount of reducing agent, including frequency, duration and concentration, according to methods described herein, may lead to more effective corrosion inhibition methods. The reducing agent may be, for example, erythrobate, hydroxyphosphono carboxylic acid based complexing agents, or combinations thereof.

The treatment composition can include adding the metallic salts in conjunction with one of more secondary corrosion inhibitor including, for example, inorganic and organic phosphates, zinc salts, nitrite/nitrate salts, molybdate salts, chromate salts, unsaturated carboxylic acid polymers such as polyacrylic acid, homo or co-polymaleic acid (synthesized from solvent and aqueous routes); acrylate/2-acrylamido-2-methylpropane sulfonic acid (AMPS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxy-phosphonocarboxylic acid (HPA), diethylenetriamine penta (methylene phosphonic acid) (DETPMP), phosphinosuccinic oligomer (PSO); salts of molybdenum and tungsten including, for example, nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA), azoles such as tolyltriazole (TTA), benzotriazole (BZT), butylbenzotriazole (BBT), halogenated azoles and their salts.

The treatment composition may further comprise at least one chelating agent such as, for example, citric acid, azole based copper corrosion inhibitors such as benzotriazole and 2-Butenedioic acid (Z), halogenated azoles and their derivatives. The treatment composition may further comprise scale inhibitors and dispersants selected from the group consisting one or more of unsaturated carboxylic acid polymers such as polyacrylic acid, homo or co-polymaleic acid (synthesized from solvent and aqueous routes), acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS, phosphonates and phosphinates including 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxy-phosphonocarboxylic acid (HPA), diethylenetriamine penta (methylene phosphonic acid) (DETPMP), phosphinosuccinic oligomer (PSO); salts of molybdenum and tungsten including nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA), a biocide, and combinations thereof.

In another embodiment, there is provided a chemical treatment composition used to suppress corrosion of a corrodible metal surface that contacts a water stream in a water system. The composition including a combination of salts of multi-valent metals, and the hydroxycarboxylic acid promoter as described herein. The composition can be an aqueous composition that is fed into a water stream of the water system.

In embodiments, the treatment composition may be introduced into open or closed water systems. Further, the treatment can be applied to the water stream while the water system is on-line. Alternatively, the treatment composition may be introduced into the water stream while the system is offline such as during pre-treating the corrodible metal surface before the equipment is brought into service in the water system.

EXAMPLES

The following Examples illustrate applications of the treatment methods disclosed herein. In the Examples, chemical concentrations used are expressed in parts per million (ppm). The unit of corrosion rate is in mils per year (mpy). The corrosion inhibition efficiency was calculated according to the following equation:

$$\% \text{ Impovement} = \left[ \frac{CR\,w/\text{single treatment} - CR\,w/\text{synergy}}{CR\,e/\text{single treatment}} \right] \times 100\%$$

The water chemistry used for these Examples was as follows:

| Neutral Alkaline Water | |
| --- | --- |
| pH | 7.8-8.0 |
| Ca as CaCO$_3$ | 600 ppm |
| Mg as CaCO$_3$ | 300 ppm |
| Sulfate | 600 ppm |
| Malk as CaCO$_3$ | 75 ppm |
| Silica as SiO$_3$ | 10 ppm |
| Chloride | 430 ppm |

| Alkaline Water | |
| --- | --- |
| pH | 8.2-8.4 |
| Ca as CaCO$_3$ | 500 ppm |
| Mg as CaCO$_3$ | 300 ppm |
| Sulfate | 300 ppm |
| Malk as CaCO$_3$ | 150 ppm |
| Silica as SiO$_3$ | 10 ppm |
| Chloride | 500 ppm |

In each Example, carbon steel 1010 coupons were used and corrosion rates were determined by using a 10 L "spinner bath" apparatus. Corrosion rates were calculated over 3 days at 50° C.

Example I

In this example, Examples 1-2 and Comparative Example 1 were tested in the alkaline water chemistry described above. The Examples have glucaric acid, tin (from stannous chloride), and aluminum in the amounts indicated. In each example, 100 ppm of additive was dosed. The results are illustrated in Table 1 below.

TABLE 1

| Sample | Sn (ppm) | HCA (ppm) | Al (ppm) | % Improvement in Corrosion Rate |
| --- | --- | --- | --- | --- |
| Example 1 | 0.75 | 7.5 | 0.5 | 79 |
| Example 2 | 0.5 | 7.5 | 0.5 | 85 |
| Comparative Example 1 | 1.25 | 7.5 | 0 | 64 |

Examples 3-4 and Comparative Example 2 were tested in the neutral water chemistry described above. The Examples have glucaric acid, tin (from stannous chloride), and aluminum in the amounts indicated. In each example, 100 ppm of additive was dosed. The results are illustrated in Table 2 below.

TABLE 2

| Sample | Sn (ppm) | HCA (ppm) | Al (ppm) | % Improvement in Corrosion Rate |
|---|---|---|---|---|
| Example 3 | 0.75 | 7.5 | 0.5 | 75 |
| Example 4 | 0.5 | 7.5 | 0.5 | 86 |
| Comparative Example 2 | 1.25 | 7.5 | 0 | 69 |

As seen in Tables 1 and 2, Examples 1-4, corresponding to disclosed embodiments, resulted in substantially better corrosion rates than Comparative Examples 1-2. Improvement of about 20% was observed by adding aluminum to the Tin/glucaric acid combination. Similar improvement was observed in both alkaline and neutral pH water conditions.

This data shows that substantially less tin inhibitor can be used when aluminum is included, which is very beneficial because tin is by far the most expensive component. Moreover, the best results were obtained when using lower amounts of tin by using aluminum in combination within the acceptable ranges of the disclosed embodiments. These results suggest that the treatment methods using tin, aluminum, and glucaric acid in combination resulted in better corrosion rates with lower concentrations of inhibitor, metal salt, and promoter as compared to conventional methods using tin and glucaric acid alone.

In summary, the treatment methods using tin, aluminum, and glucaric acid in combination resulted in dramatically better corrosion rates while allowing for substantially less tin than is required in conventional methods using tin and glucaric acid alone to achieve comparable corrosion resistance.

Example II

In this example, various samples were tested in alkaline water chemistry at ambient temperature as shown in the table below.

| Sample | concentration |
|---|---|
| Control (water) | |
| Example 5 (HCA + 2.5% Sn) | 150 ppm |
| Example 6 (HCA + 1% Sn + 1% Al) | 150 ppm |
| Zn | 0.75 ppm |
| $PO_4$ | 3.75 ppm |
| Zn + $PO_4$ | 0.75 ppm + 3.75 ppm |

As seen in the plot of FIG. 1, Example 6 exhibited the best anti-corrosion performance as evidenced by the large diameter of its Nyquist plot.

Example III

In this example, various samples were tested in alkaline water chemistry at ambient temperature as shown in the table below.

| Sample | concentration |
|---|---|
| Control (water) | |
| Example 5 (HCA + 2.5% Sn) | 200 ppm |
| Example 6 (HCA + 1% Sn + 1% Al) | 200 ppm |
| Zn | 1 ppm |
| $PO_4$ | 5 ppm |
| Zn + $PO_4$ | 1 ppm + 5 ppm |

Figure 2A:
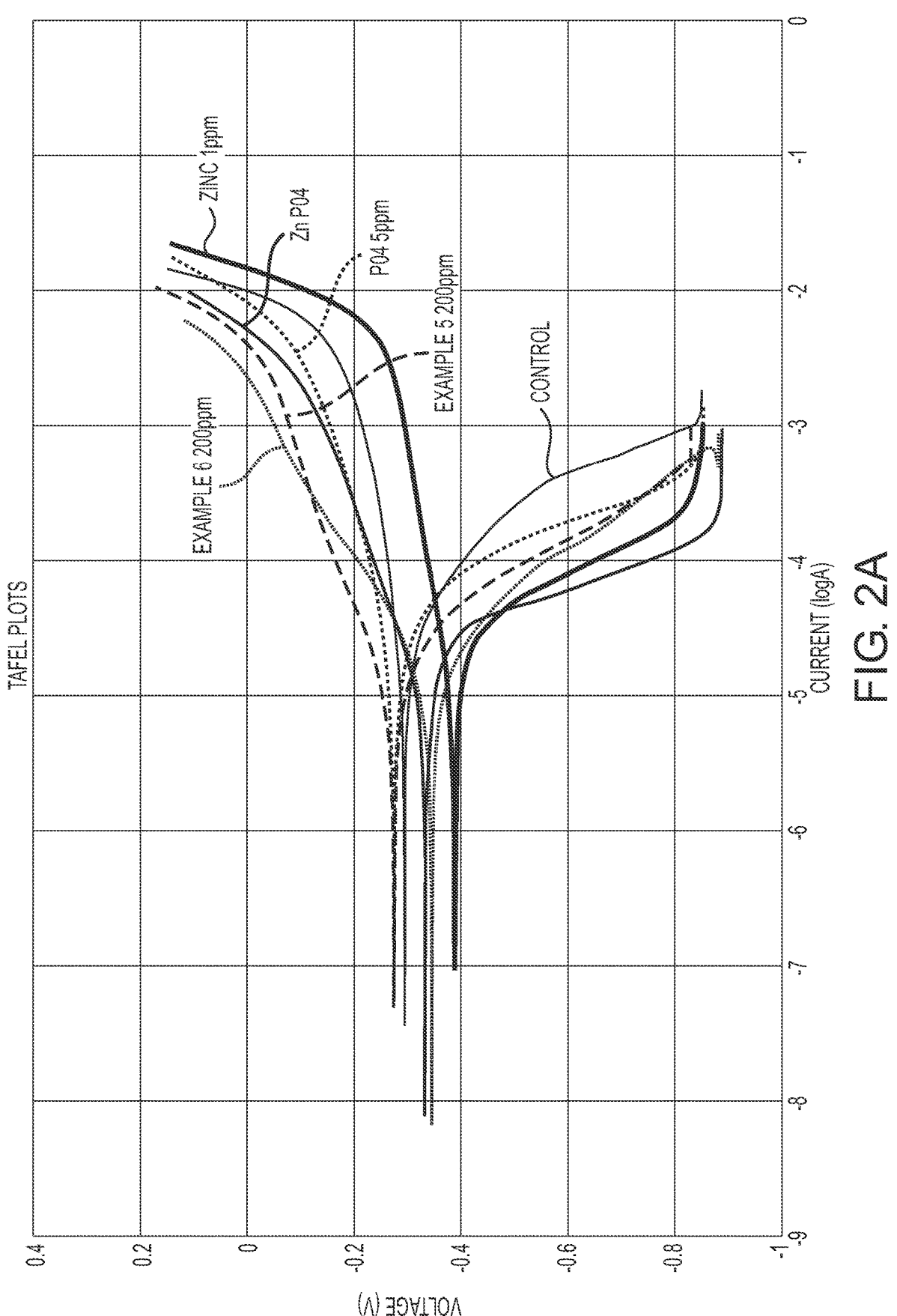
FIG. 2A and FIG. 2B are Tafel graphs showing corrosion inhibition performance of various treatment compositions.
Figure 2B:
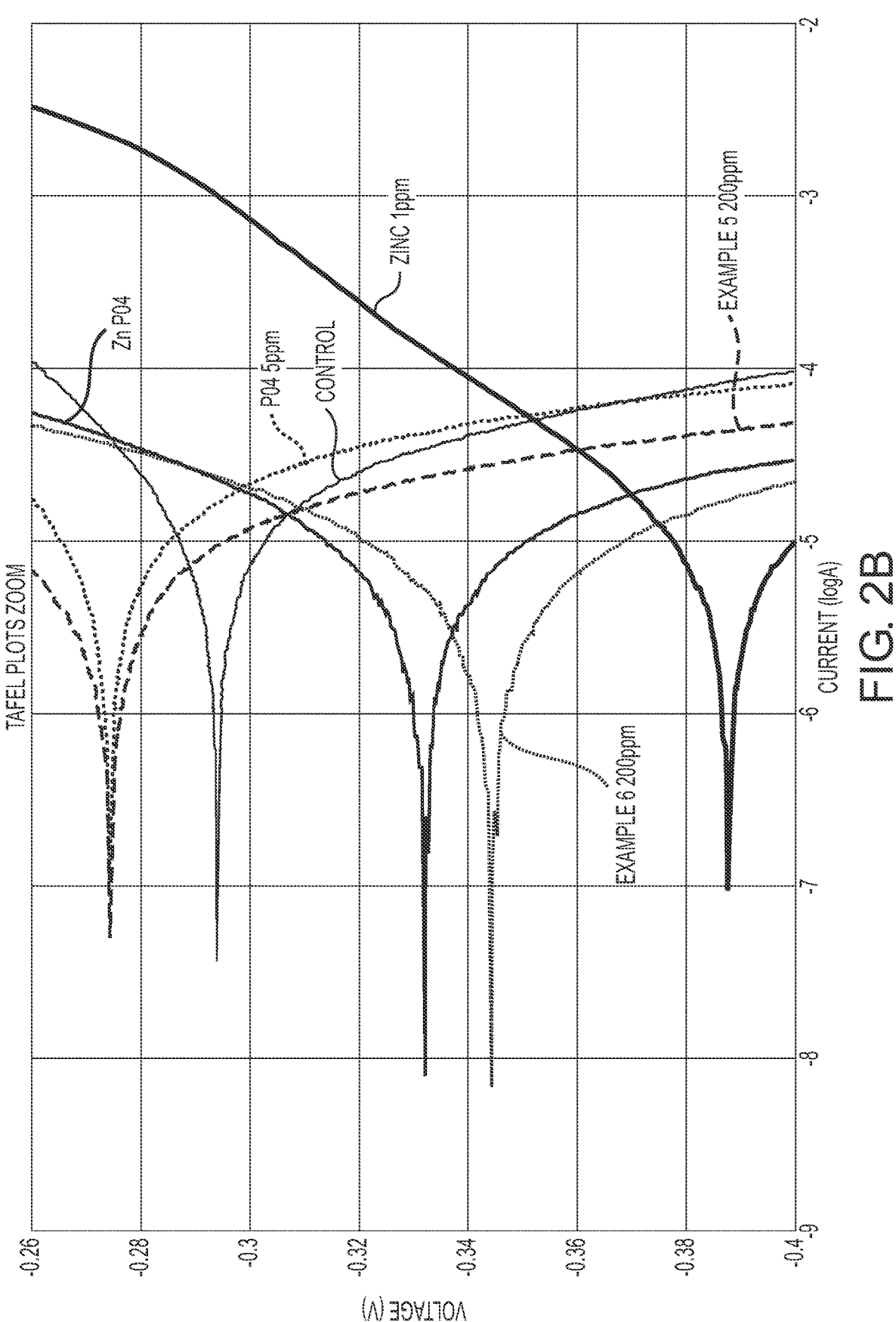

As seen in FIGS. 2A and 2B, Example 6 exhibited the best anti-corrosion performance as evidenced by the left-most divergence of the EIS plot along the x-axis (resistance to corrosion).

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the following claims. As such, various changes may be made without departing from the spirit and scope of this disclosure as defined in the claims.

What is claimed is:

1. A method of suppressing corrosion of a corrodible metal surface that contacts a water stream in a water system, the method comprising:

introducing into the water stream a treatment composition including (i) a combination of passivators that include at least two multivalent salts selected from the group consisting of manganese, tungstate, aluminum, and tin, and (ii) a hydroxycarboxylic acid promoter, the hydroxycarboxylic acid promoter having a carboxylic acid group and a hydroxyl group that is bonded to a carbon atom that is adjacent to the carboxylic acid group, wherein the treatment composition is introduced so that (i) the concentration of the combination of the passivators in the water stream is in the range of 0.1 to 10 ppm, (ii) the concentration of the promoter in the water stream is in the range of 2 ppm to 50 ppm, and (iii) the ratio of the concentration of the combination of the passivators to the concentration of the promoter is in a the range of from 0.01 to 0.4.

2. The method of suppressing corrosion according to claim 1, wherein the treatment composition is introduced so that the concentration of the combination of the passivators is in the range of 0.25 to 1.25 ppm, and the concentration of the promoter in the water stream is in the range of 7.5 ppm to 20 ppm.

3. The method of suppressing corrosion according to claim 1, wherein one of the at least two multivalent salts is tin.

4. The method of suppressing corrosion according to claim 1, wherein the tin is provided as a stannous salt selected from the group consisting of stannous sulfate, stannous bromide, stannous chloride, stannous oxide, stannous phosphate, stannous pyrophosphate, and stannous tetrafluroborate.

5. The method of suppressing corrosion according to claim 1, wherein the at least two multivalent salts include tin and aluminum.

6. The method of suppressing corrosion according to claim 5, wherein the aluminum is provided as an inorganic aluminum salt selected from the group consisting of aluminum chloride, aluminum nitrate, and aluminum sulfate.

7. The method of suppressing corrosion according to claim 5, wherein the aluminum is provided as an organic aluminum salt selected from the group consisting of aluminum citrate and aluminum glucanate.

8. The method of suppressing corrosion according to claim 1, wherein the hydroxycarboxylic acid promoter is selected from the group consisting of tartaric acid, glucaric acid, glucoheptonate, and gluconic acid.

9. The method of suppressing corrosion according to claim 8, wherein the hydroxycarboxylic acid promoter is glucaric acid.

10. The method of suppressing corrosion according to claim 1, wherein the treatment composition further comprises at least one reducing agent.

11. The method of suppressing corrosion according to claim 1, wherein the treatment composition further comprises at least one dispersant selected from the group consisting of unsaturated carboxylic acid polymers, phosphonates, phosphinates, and amines.

12. The method of suppressing corrosion according to claim 1, wherein the water system is selected from the group consisting of cooling towers, water distribution systems, boilers, water/brine carrying pipelines, and storage tanks.

13. The method of suppressing corrosion according to claim 1, wherein the corrodible metal surface is a metal or alloy selected from the group consisting of ferrous metals, aluminum metals, brass, copper containing alloys, mild steels, carbon steels, and galvanized steels.

14. The method of suppressing corrosion according to claim 1, wherein the treatment composition is provided in sufficient amount and for sufficient time to form a stable protective film on at least a portion of the corrodible metal surface.

15. The method of suppressing corrosion according to claim 1, wherein the treatment composition is introduced into the water stream while the water system is on-line.

16. A method of suppressing corrosion of a corrodible metal surface that contacts a water stream in a water system, the method comprising:

introducing into the water stream a treatment composition including (i) a combination of salts of multi valent metals a tin salt and an aluminum salt and (ii) a hydroxycarboxylic acid promoter, the hydroxycarboxylic acid promoter having a carboxylic acid group and a hydroxyl group that is bonded to a carbon atom that is adjacent to the carboxylic acid group, promoter that is selected from the group consisting of tartaric acid, glucaric acid, glucoheptonate, and gluconic acid, wherein the treatment composition is introduced so that (i) the concentration of the combination of the tin salt and the aluminum salt in the water stream is in the range of 0.1 to 10 ppm, (ii) the concentration of the promoter in the water stream is in the range of 2 ppm to 50 ppm, (iii) the ratio of the concentration of the tin salt in the water stream to the concentration of the promoter in the water stream is in the range of from 0.01 to 0.4, and (iv) the ratio of the concentration of the aluminum salt in the water stream to the concentration of the promoter is in a the range of from 0.01 to 0.4.

* * * * *